United States Patent [19]
Phillips et al.

[11] 3,800,596
[45] Apr. 2, 1974

[54] TUBING TESTING METHODS

[76] Inventors: Clayton L. Phillips, Rt. 14, Box 793-B, Houston, Tex. 77040; Don R. Switzer, 503 Three Corners Dr., Houston, Tex. 77024

[22] Filed: Feb. 16, 1970

[21] Appl. No.: 11,457

Related U.S. Application Data

[60] Division of Ser. No. 718,186, April 2, 1968, Pat. No. 3,495,443, which is a continuation-in-part of Ser. No. 462,811, June 10, 1965, Pat. No. 3,375,703.

[52] U.S. Cl............................................. 73/40.5 R
[51] Int. Cl............................................... G01m 3/02
[58] Field of Search....... 73/40.5, 40; 166/179, 187; 277/9.5, 116–116.9, 123–125

[56] References Cited
UNITED STATES PATENTS 3,165,920   1/1965   Loomis ............................ 73/40.5 R
3,375,703   4/1968   Phillips et al. .................... 73/40.5 R

*Primary Examiner*—Donald O. Woodiel
*Attorney, Agent, or Firm*—W. F. Hyer; Marvin B. Eickenroht

[57] ABSTRACT

A tool and associated portable apparatus is brought on a mount to test location with tool disposed successively in the stand of tubing occupying top position in a well bore tubing string, the associated apparatus being disposed, as with tool hoist on rig floor, in quickest testing methods. Thus packer setting fluid is applied through one tool channel to deform packers, by pre-adjusted tool piston travel, to adjusted extent to isolate an annular space to receive test fluid supplied through an entirely separate tool channel into the isolated space to test the stand for leakage. The test fluid may be an inert gas allowed to expand after testing so less is expended as the packers are unset.

3 Claims, 14 Drawing Figures

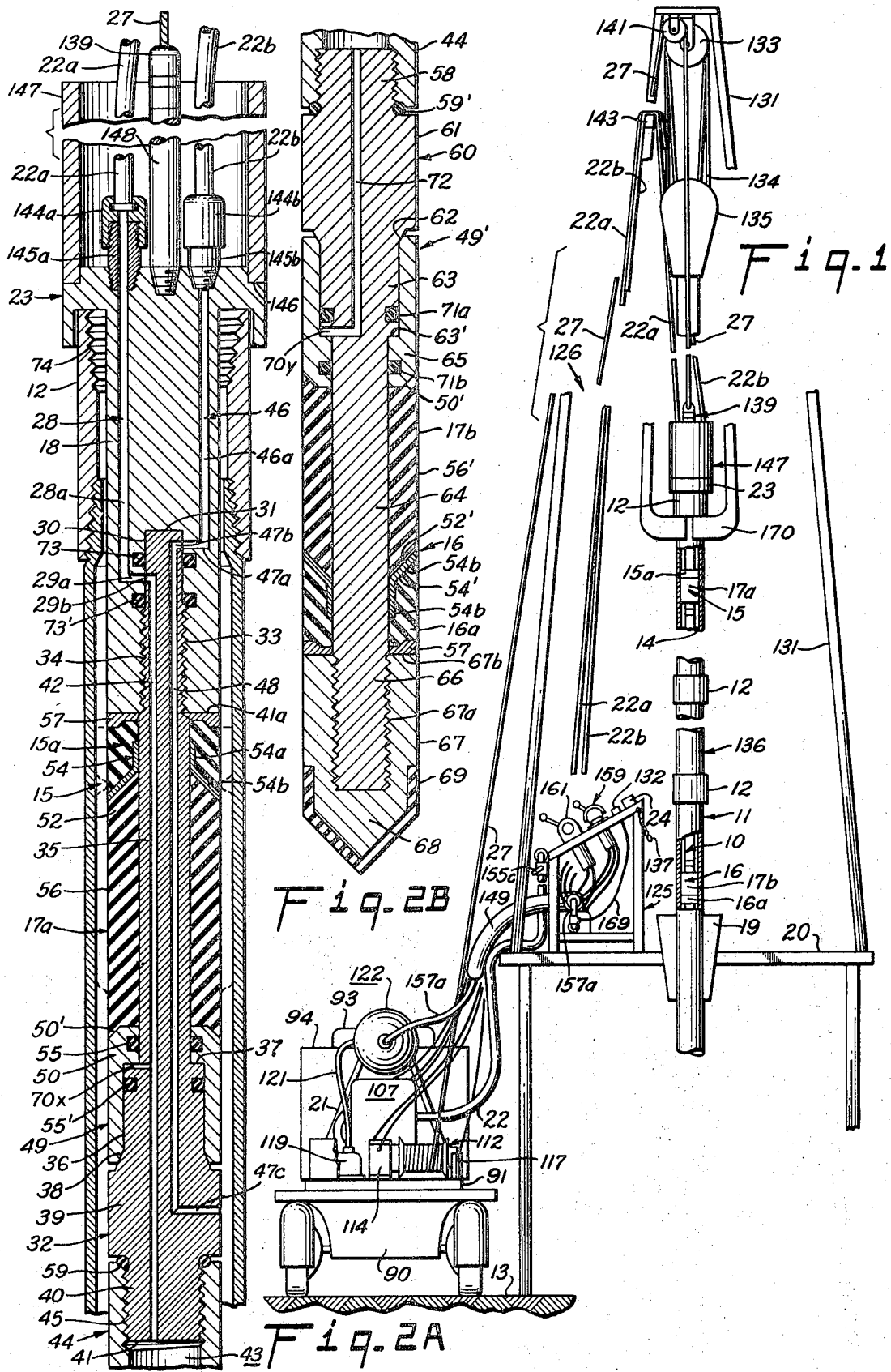

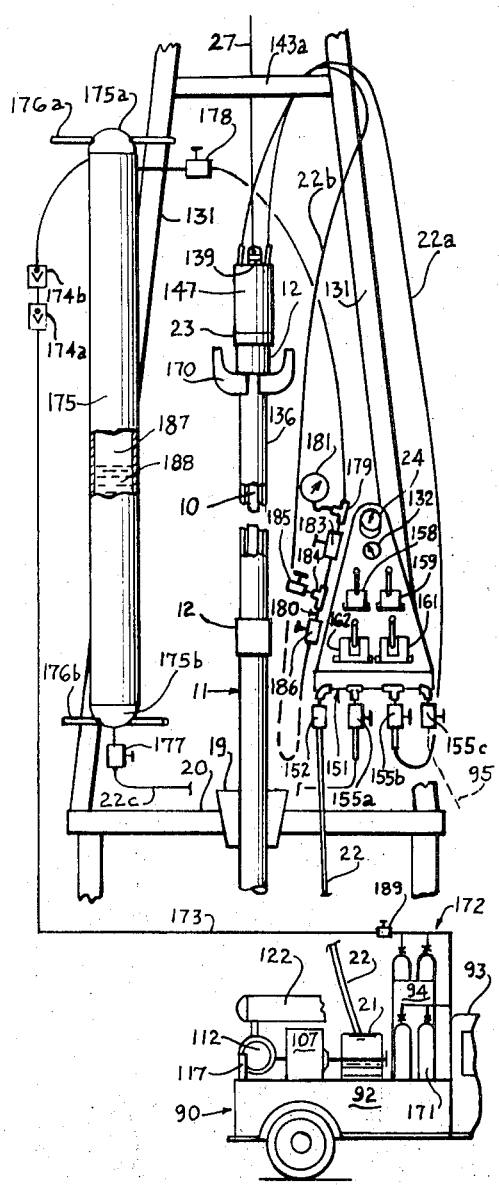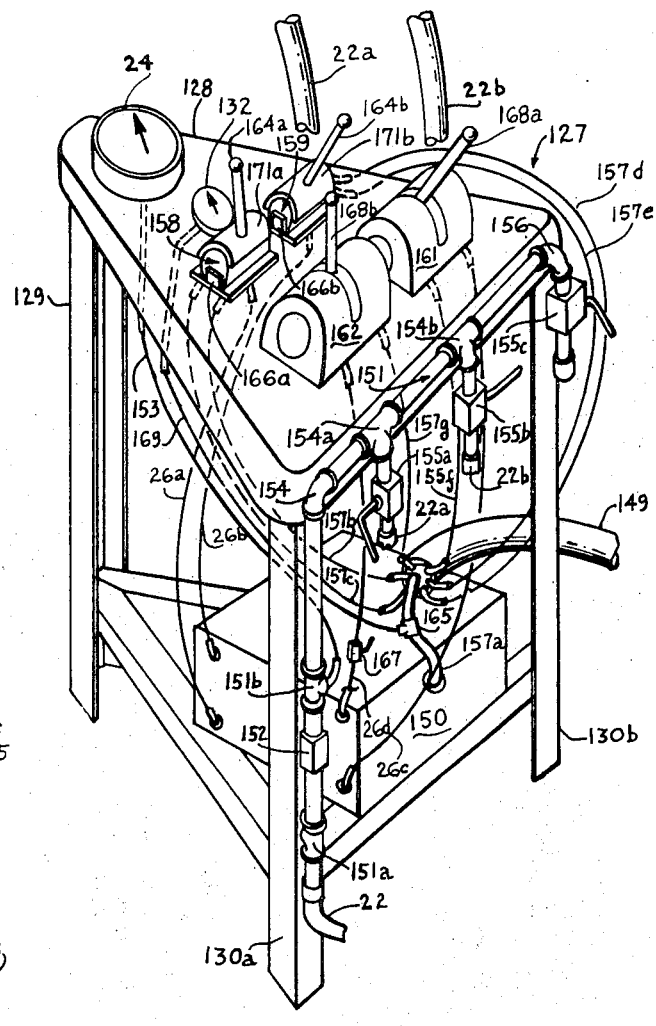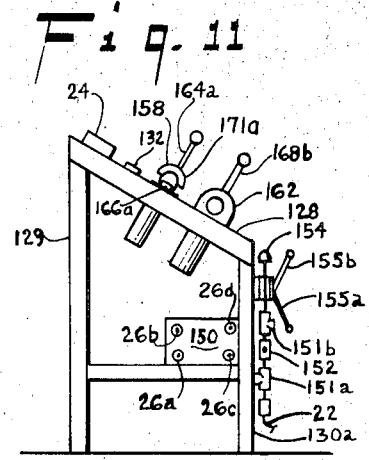
Fig. 11
Fig. 9
Fig. 10

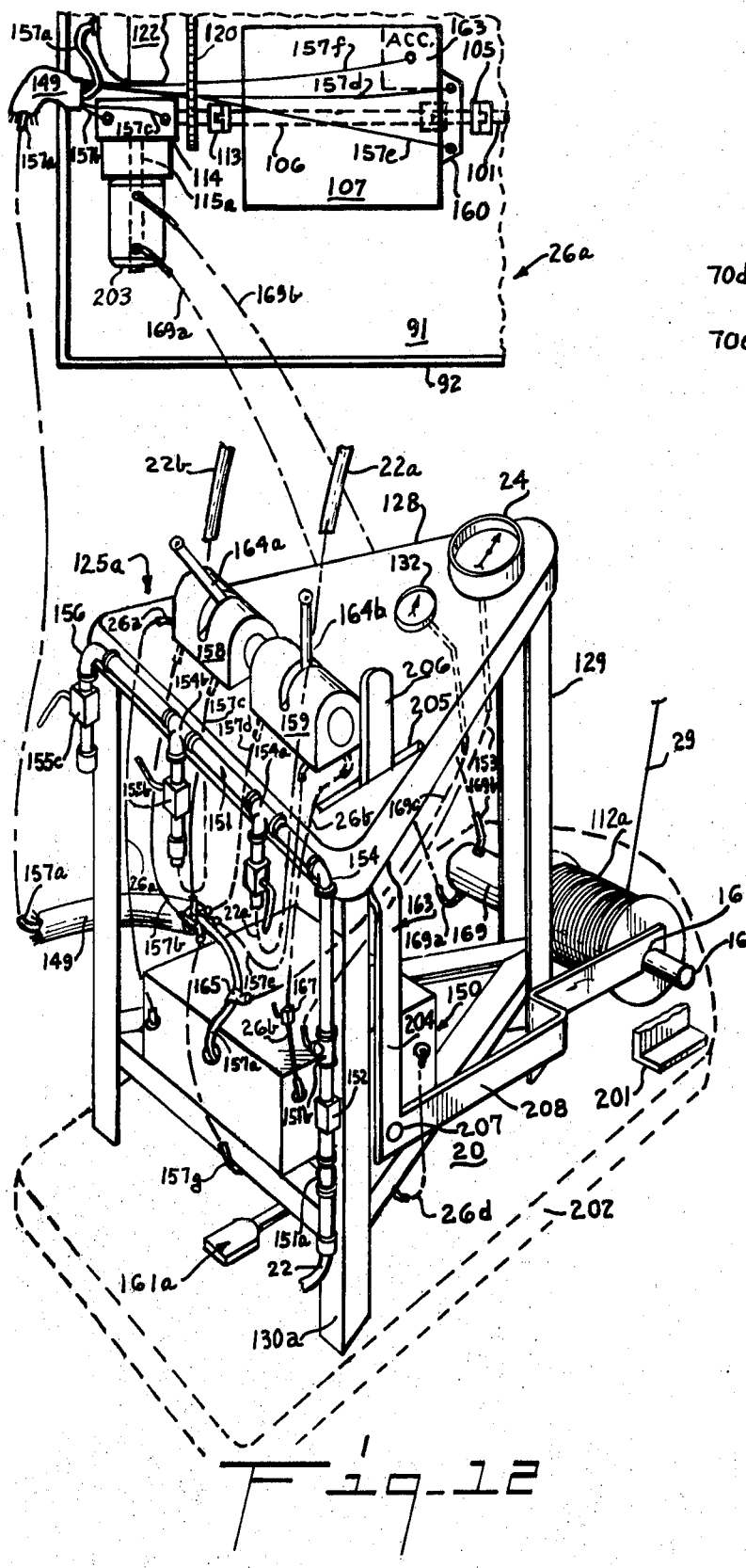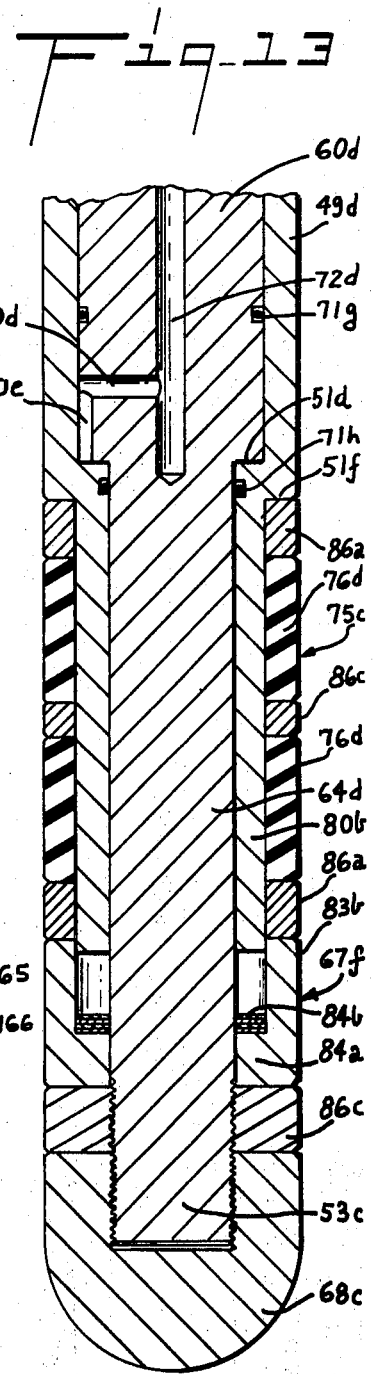

TUBING TESTING METHODS

This application is a division of application Ser. No. 718,186 filed Apr. 2, 1968 for TUBING TESTING APPARATUS AND METHODS now U.S. Pat. No. 3,495,443 which application was in turn a continuation-in-part of application Serial No. 462,811, filed June 10, 1965, for TUBING TESTING APPARATUS AND METHODS now U.S. Pat. No. 3,375,703.

This invention relates to tubing testing apparatus and methods including a specialized tubing testing tool, apparatus for controlling the fluid operation thereof from a derrick floor, and apparatus carried by vehicle means including the supplied fluid and operating materials, also all of the equipment controlled by the aforesaid device; and the invention also relates to methods of testing tubing where the standards of test accuracy may vary as to various tests being made as with water; with water and a fluourescent coloring material; with an inert gas, as nitrogen, and with such a gas and material sprayed upon areas of suspected leakage.

As a primary object the invention sets out to provide a testing tool having a packer setting flow passage thereinto which sets spaced apart packers in a tubing to be tested, and which has a separate flow passage thereinto through which testing fluid may be applied to test for leakage in the surrounding tubing section; the same fluid, as water, being used in both flow passages.

It is also another primary object of the invention, comprised by the part thereof that is new, to provide a testing tool of the class hereinabove described, with the terminal assembly of the tool providing a means for pre-adjusting piston stroke whereby selectively to set the tool packers firmly in well tubing of different inner diameters.

Also, it is a further important object of the invention, comprised by the part thereof that is new, to provide well testing apparatus of this class which includes a console with tool hoist disposed on the drilling rig floor, the hoist motor being driven by fluid from a hydraulic pump on the transportation means and driven by the engine thereon.

It is a further object of this invention to provide a testing tool which may be operated by one means to set the packers, and which may be operated by a difrerent means or fluid, as an inert gas, to test for leakage at any predetermined pressure.

Also, as another object, the invention provides a tool which uses one fluid to set the packers, and a less costly fluid to test successive areas, the test fluid being expendable after each test.

It is also an object of the invention to provide a testing tool of this class which is adjustable to accommodate various axial lengths of packers along the testing mandrels.

It is a particular object of this invention to provide a tubing tester which can set tubing for leakage both in a well bore or outside a well bore and where the tubing may be of various strengths and in various stages of assembly so that such tubing may have to be tested at various pressures to test for leakage under various requirements of strength and tightness of assembly.

It is also an object of this invention to provide a tool for testing tubing of this class which is adapted to provide a first seal at either end of the space to be tested, such first seal to be supported by a second seal at such end as the testing pressure may be increased.

It is a further object of this invention to provide a tool for testing tubing of this class wherein the packers sealing off the the space to be tested may be set at one pressure and the tube to be tested may be tested at another pressure.

It is yet a further object of this invention to provide a testing tool of this class which may be increased in length selectively to test equipment of various lengths.

It is also an object of this invention to provide a testing tool of this class having a separation means between the packers at either end of the test space area whereby to prevent cold flow between packers of different hardness and resiliency.

It is also a further object of the invention to provide a tubing tester of this class having segmented packer means installable upon a sleeve extension of the piston whereby the sleeve protects the mandrel, the mandrel having seal carrying means thereon adjustable with relation to the piston to limit piston travel.

It is another and important object of the invention to provide a tubing tester of this class in which the packer setting fluid pressure required to set the packers may be a fractional value as compared with the required testing pressure.

Objects of the invention pertaining to apparatus associated with the testing tools and methods of use include the following objects;

As a primary object, the invention provides for tubing testing apparatus, transportable on a single vehicle, and so operable that only the testing tool and a console are used on the drilling rig floor, and in manner that a single operator may operate the console to actuate the testing tool and to control and bring into play all the other necessary cooperative apparatus, which may remain disposed on the vehicle, or vessel, which has brought it to location.

Additionally the invention has an additional and important object, the provision of a structure and method of this class which includes method and structure permitting the use of a predetermined fraction of compressed air pressure capacity to brake the cable handling winch drum, whereby the operator does not have to continuously manipulate the application of the winch drum brake during an operation.

Furthermore, the invention has as an object the concentration of all controls on a console easily manipulated from the drilling platform floor in order to control every step of the testing operation, with no operator being require to actuate the apparatus on the vehicle or vessel on which the apparatus is brought to location.

Also, another and further important object, the invention includes a method and structure of this class, whereby the two conduits supplying fluid, respectively to set the packers of the tool, and to test tubing, are connected to the tool and suspended from the drilling rig in manner that these conduits need not be removed from the tool between each successive testing operation.

The invention also has an object the provision of a tool and apparatus of this class which may employ a colored gas, a mixture, or a colored liquid in the course of testing to indicate leakage in a tubing stand being tested.

Other and further objects will be apparent when the specification herein is considered in connection with the drawings, in which:

FIG. 1 is an elevational view, part in section, showing a testing tool in testing position, with water conduits, console and truck carried apparatus disposed in operative position;

FIG. 2A shows the upper portion of the tool shown in assembly in FIG. 1;

FIG. 2B shows the lower end of the tool shown in assembly in FIG. 1;

FIG. 9 is an isometric view of the front, top and one side of a console;

FIG. 10 is a side elevation taken along line 10—10 of FIG. 9;

FIG. 11 is an elevational view, partially diagrammatic, showing apparatus for testing with a gas, as nitrogen, and also showing the use of the gas in testing;

Figure 3:
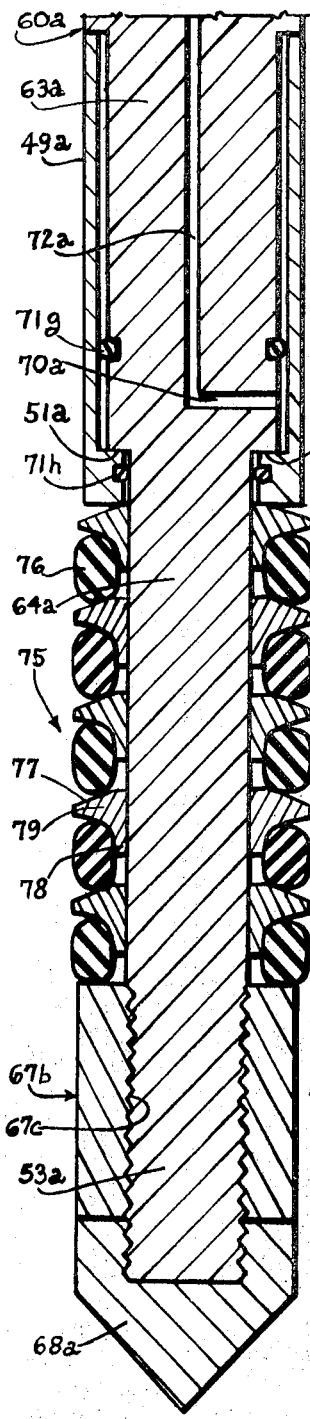
FIG. 3 is an improved embodiment of packer assembly as shown installed on the lower end of the mandrel shown in FIG. 2B.

FIG. 12 is an isometric view, partially diagrammatic, showing the console, with the tool hoist, on the rig floor; the drive means for the hoist being indicated diagrammatically on the transportation means; and FIG. 13 is a sectional elevational view of the lower end portion of the well tool, showing means for selectively adjusting the length of piston travel, whereby to regulate the degree of expansion of the packers, as dictated by respective inner diameters of the well tubing.

Referring in detail to the drawings in which like reference numerals are applied to like elements in the various views, a conventional drilling rig 126 is shown in FIG. 1 having a platform 20 above the ground level 13, and a derrick 131 thereabove, with a crown block 133 mounted immediately below the top of the derrick 131, and a travelling block 135 suspended below the crown block 133 to be raised and lowered by the rig cables 134.

A tubing string 11 is shown in FIG. 1 supported by conventional drilling rig slips 19 at platform 20. The tubing string 11 is composed of "stands" of pipe or tubing, a stand being comprised of one, two, or three, or even more adjoined sections. The stands awaiting assembly, not shown in FIG. 1, are stacked to stand up from the rig floor 20, to lean outwardly at the top as supported by the upper part of the derrick 131. The stands are lifted by the drilling rig elevators 170 which are suspended from the travelling block 135 and the tubing string 11 is successively increased in length, stand by stand, by threading the lower end of the lowermost section of a stand to be added, into that nipple or connection member 12, shown in FIG. 2A, as the uppermost member of the uppermost stand 136 of the tubing string 11.

When a stand is added and tested, the weight of the tubing string 11 is then supported by the travelling block 135, so that the slips 19, shown in FIG. 1, which have been supportingly engaged in the stand just above the level of the derrick floor 20, and below the uppermost stand under test, may be retracted. Then the tubing string 11, as engaged by the elevators 138, just below the top nipple 12, may be lowered by the travelling block 135 to position the newly added and tested stand of tubing just above the platform 20, and the slips 19 may be re-engaged, to support the tubing string. 11.

Prior to testing a top stand, just added, for leakage, it is necessary first to "pack off" or isolate the annular test space 14 within the tubing string 11 and around the tool 10. The test space 14 is the length of a stand of tubing and extends upwardly from just below the lowermost nipple 12 of that stand of tubing which has been tested to an elevation just below the uppermost nipple 12 of the aforesaid, now uppermost stand.

When a tubing string 11 is ready to be lowered into a well bore, a truck 90, as shown in FIG. 1, together with a first and second service operator, has arrived at the location of the drilling rig 126, and the tool has been taken in parts from the truck 90 and assembled by the first service operator. In the meantime the drilling rig crew lends the use of the travelling block 135 to the first service operator, who connects the lift chain 137 of a console 125, to be engaged by appendages from the travelling block 135, and then the travelling block 135 is actuated by the rig crew to lift the console 125 ane the conduits attached thereto, to the drilling rig floor 20, to be disposed as indicated in FIG. 1. The second service operator has taken the free end of a wire line or winch cable 27 from a winch 112, mounted on the truck bed 92, and has passed this free end through a sheave block 141, and has then taken the sheave block 141 with the end of the cable 27 to the top of the derrick 131, the winch drum 116 being declutched of "free wheeling" to pay out the cable. The second service operator suspends the sheave block from below the top of the derrick, and adjacent to the drilling rig crown block 133, and then brings back the free end of the cable or wire line 27 to the drilling rig floor or platform 20.

The truck bed 92 carries a water tank 94 just behind the truck cab 93, and behind the water tank 94 a skid 91 has mounted thereon apparatus including a pump 21 driven by a Diesel engine 107. The pump 21 draws water from the tank 94 and delivers it under pressure through a conduit hose 22 to the console 125 which controls delivery of water therefrom, selectively, into two flexible conduits or hose 22a, 22b. The second service operator now takes the free ends of hose 22a and 22b up inside the derrick 131 and suspends them over, and ties and tapes them to an upper derrick member 143 at predetermined distance from the free ends thereof, letting the free end portions extend downwardly to the drilling rig floor or platform 20, or slightly thereabove.

The free ends of the hose 22a, 22b are then passed through a guide sleeve 147, as shown in FIG. 1 and FIG. 2A, and have the respective free end fittings 144a, 144b thereof threadably connected over respective inlet connection fittings 145a, 145b which upstand from the upper surface of the tool head 23. The wire line or lift cable 27 may now be picked up and connected into a swivel 139, which comprises the upper part of a lift bar 148, the lower end of which may now be passed through the guide sleeve 147 and threaded into a threaded bore centrally disposed in the top surface of the tool head 23.

The tool head 23 is turned down, as shown in FIG. 2A to provide a rim flange 146 on which the guide sleeve 147 is positioned when the tool 10 is ready for testing, and with the guide sleeve 147 now seated in position on the tool 10, the second operator may lift the tool 10, as by the wire line 27, which, as aforesaid, has been passed over the sheave block 141 at the top of the derrick 131, and after the lower end of the tool 10 is at an elevation just over the top of the tubing string 11, the wire line 27 may be slackened off to lower the tool 10 down through the open top of the tubing string 11 and downwardly to the position shown in FIG. 1, which is that position for testing the next stand of pipe awaiting test. In this position the tool head 23, shown in FIG. 2A as comprising an upper element of the tool top portion 18, is supported upon the top of the tubing string 11, the tool head 23 being provided with an underside annular groove 74 which seats upon the nipple 12 at the top of the uppermost tubing stand 136.

It is of vital importance that the guide sleeve 147 is provided, so that when in lowered or operative position of the tool 10, as well as in raised position thereof, the hose 22a, 22b extend upwardly, and not transversely, from the tool head 23, thereby to insure that the connections of hose to tool head 23 may not be broken off, as by the exertion of shear in combination with pull thereon, as otherwise might occur.

Also, to protect the hose 22a, 22b, the sleeve 147 must be of sufficient diameter and wall thickness to permit the hose 22a, 22b to be draped arcuately over the top of the sleeve 147 when the tool 10 is raised up out of testing position, whereby the hose 22a, 22b are disposed so that the slack provided by lifting them, drapes downwardly in loops between the top of the tool 10 and the positions thereabove at which the hose 22a, 22b are taped to the horizontally extending derrick member 143.

As shown in FIG. 1, an air compressor 119 on the truck bed 92, delivers compressed air through a discharge conduit 121 to a tank or reservoir 122, which is connected by a flexible hose or core conduit 157a, passing centrally through a sheath 149, to a manifold 150, which has been taken with the console 125 to the drilling rig floor 20.

Also small scale, flexible compressed air conduits are indicated rising from apparatus shown in FIG. 1, but without reference numerals being assigned thereto, and these extend through the sheath 149, outwardly of the supply conduit core 157a therein, to be controlled from the console 125 to operate, respectively, a gear box and clutch assembly 114 for selectively engaging and driving the winch 112; a pneumatic cylinder 117 which controls the braking of the drum 116 of the winch 112; the acceleration and de-celeration of the Diesel engine 107; and the engaging and disengaging of a clutch, not shown in FIG. 1, which respectively establishes and disestablishes driving connection between the shaft of the Diesel engine 107 with the water pump 21.

In FIG. 2A, the inlet fitting 145a into the tool head 23 establishes water communication with a vertical upper channel 28a of a packer setting water course 28 which delivers water to set respective upper and lower packers 15 and 16, to be hereinbelow described. The channel 28a terminates in a radially inwardly extending passage 29a to a smooth bore 30 within the tool top portion 18. Immediately below the tool top portion 18 an upper mandrel 32 has successively an upper end 31 which fits into the smooth bore 30, an externally threaded portion 33 which is engaged into a threaded bore 34 provided in the lower end of the tool top portion 18, a shank 35 of substantial length, and a larger diameter, upper central portion 36 providing an upwardly facing shoulder 37.

The upper central portion 36 of the upper mandrel 32 adjoins a tapered part 38 therebelow which in turn joins a largest or full diameter lower central portion 39. The lower end 40 of the upper mandrel 32, below the portion 39, is of substantially the outer diameter of the upper central portion 36, and has external threads thereon for threaded engagement with the internally threaded upper bore 45 of a tubular member or connection coupling 44, to be hereinbelow described. When the tool 10 is fully made up, the passage 29a communicates with a radially inwardly extending passage 29b in the upper end 31 of an upper mandrel 32, and this passage 29b communicates in turn with a channel 42 which extends vertically downwardly in the upper mandrel 32 and terminates at its lower end in the lower face 41 of the upper mandrel lower end 40, and thus empties into a hollow space 43 provided as the interior of the aforesaid tubular member 44.

A testing fluid passage 46 is also provided in the tool top portion 18 and in the upper mandrel 32 and such passage 46 includes a vertically downwardly extending channel 46a which extends from the inlet connection 145b to a radially inwardly, horizontally extending passage 47a provided in the tool top portion 18. When the tool 10 is fully made up the passage 47a communicates in assembly with a radially inwardly, horizontally extending passage 47b into the mandrel upper end 31. Thence, the testing fluid passage 46 extends downwardly as a vertically extending passage 48 and terminates in a horizontally extending, radially outward passage 47c, which passes from the lower central portion 39 of the mandrel 32 to the exterior of the tool 10.

Prior to assembly with the tool top portion 18, the upper mandrel 32 has slidably installed thereover to be successively installed from uppermost to lowermost positions: first, an upper cup 49 to seat upon the shoulder 37 and to extend thereabove around the mandrel shank 35 and therebelow around the upper central portion 36 of the mandrel 32; then an upper pressure packer 17a, comprising the lowermost part of the upper packer 15; then a sleeve 54; thereafter an upper safeguarding packer 15a; and uppermost, a washer 57 which bears against the lower end or face of the tool top portion 18 when the mandrel externally threaded part 33 is threaded full up in the internally threaded bore 34 within the tool top portion 18, the washer 57 being urged against the upper mandrel lower end by the cumulative action of the packer elements 15a and 17a.

The safeguarding packer 15a comprises uppermost a frusto-conical part to fit within a correspondingly recessed portion within the underside of the washer 57, and therebelow it comprises a cylindrical portion with lower surface counterbored and countersunk to receive, respectively, the uppermost, cylindrical portion 54a of the sleeve 54, and the hollow frustoconical or recessed lowermost portion 54b thereof.

The upper pressure packer 17a has uppermost a frustoconical part 52 to fit within the lower part 54b of the sleeve 54, and therebelow the pressure packer 17a has a main sleeve or cylindrical portion 56 with a frustoconically shaped recess in the base thereof. The cup base 50 on top of which the cylindrical portion 56 of the pressure packer 17a is seated, has outermost, at the top thereof, a chamfered rim 50' over which seats the correspondingly recessed, lowermost, outer part of the aforesaid packer cylindrical portion 56. The cup 49 has its lowermost part slightly countersunk to fit on the aforesaid chamfered or tapered portion 38 of the upper mandrel 32 in manner that the lower end of the upper cup 49 clears the upper shoulder of the mandrel lower central portion 39.

The upper, safeguarding packer 15a is of substantially harder material than the pressure packer 17a, whereby it is properly termed the safeguarding packer, whereas the pressure packer 17a, which is longer, of softer rubber, and more deformable, is in like manner properly termed.

A lower mandrel 60 includes successively from top to bottom, an externally threaded upper end 58 for engagement with the internally threaded lower end of the tubular member 44, a full diameter, upper central portion 61, a tapered portion 62, a reduced diameter, lower central portion 63, and a further reduced diameter, shank 64, including lowermost an externally threaded end portion 66, the lower central portion 63 thus providing a downwardly facing shoulder 63'.

At the upper end of the tubular member 44, at the junction where it would otherwise shoulder against the upper mandrel 32, an O-ring seal 59 is provided, and also at the lower end of the tubular member 44 at the junction where it would otherwise shoulder against the lower mandrel 60, an O-ring seal 59' is provided.

The lower mandrel 60 has slidably assembled thereon: first, a lower cup 49' as the uppermost element thereon, the inner surface of its base 65 seating upwardly against the shoulder 63'; second, a lower pressure packer 17b, constructed in correspondence with the upper pressure packer 17a, with upper surface to bear against the outer surface of the lower cup base 65; third, a sleeve 54'; fourth, a lower safeguarding packer 16a; fifth, a washer 57; and sixth, and lowermost, a nut 67 having an internally threaded central bore 67a through the upper face thereof. Thus, as the lower mandrel assembly is completed, the upper face of the nut 67 bears against the outer or lower face of the lower spacer washer 57, and the packers 16a and 17b, which together comprise the lower packer 16, cumulatively urge against the lower cup 49', as the countersunk, outer uppermost surface of the lower pressure packet 17b bears against the underside of the lower cup base 65, including the chamfered outer surface 50' thereof. Also, as a protective guard sheath for the nut 67, a rubber cover 69 is installed over a conically shaped or pointed lower end 68 comprising the lower part of the nut 67.

The lower cup 49' has its uppermost part slightly countersunk to fit on the aforesaid tapered portion 62 of the lower mandrel 60 while the upper end face of the lower cup 49' clears the lower shoulder of the upper central portion 61 of the lower mandrel 60. The lower pressure packet 17b has uppermost its countersunk or recessed base which fits the chamfered contour 50' of the underside of the lower cup base 65, and therebelow a cylindrical portion 56', and terminates in a frusto-conical lower end 52'.

The sleeve 54' comprises an uppermost hollow frustoconical or recessed portion 54b and a cylindrical portion 54a lowermost, and the frusto-conical lower setting packer end 52' is received in the sleeve upper portion 54b. The lower safeguarding packer 16a comprises a counterbored and countersunk upper portion to receive the lower sleeve 54' therein, and the lower end of the safeguarding packer 16a is frusto-conical to be received in a corresponding recess in the upper surface of the lower spacer washer 57.

An O-ring 73 is provided to seat in an annular groove in the tool top portion 18 and seal off against any fluid communication between the packet setting water course 28 and the testing water course 46, such seal 73 sealing around the upper end of the upper mandrel 32, between the lateral passages 47a and 29a. Also, an O-ring seal 73' is provided to seat in an annular groove in the tool top portion 18 and seal off against any fluid leakage downwardly from the passage 29a about the threads 33, 34 connecting the upper mandrel 32 into the tool top portion 18.

A lateral port 70x extends from the vertical passage 42 in the upper mandrel 32 to deliver fluid outwardly to urge upwardly against the under surface of the base 50 of the inverted cup 49. As the cup 49 must fit with sliding fit tolerance about the mandrel shank 35, it is necessary to provide an O-ring seal 55' within the mandrel portion 36 below the lateral port 70x to seal off against leakage between the mandrel and the inside of the cup. In like manner, to provide against leakage upwardly, it is necessary to seal off by providing in the cup base 50 a similar O-ring seal 55 to seal against the mandrel shank 35.

The portion 42 of the packer setting flow passage 28 communicates with the interior 43 of the tubular member 44 and thus the tubular member interior 43 serves as a part of the packer setting flow path 28. At the lower end of the tubular member 44 the flow path continues in the form of an axial flow passage 72 down the lower mandrel 60 and turns radially outwardly through a flow port 70y to communicate downwardly with the upper surface of the base 65 of the upright, or lower cup 49'. Correspondingly, as in the case of the upper or inverted cup 49, an O-ring seal 71a is provided above the flow passage 70y between the cup and the lower mandrel 60 and a similar O-ring 71b is provided below the flow passage 70y between the cup base 65 and the lower mandrel shank 64.

The tool 10, disclosed in FIGS. 2A and 2B, may be employed with the apparatus disclosed in FIG. 1, as aforesaid, and fluid, as water, may be pumped from the pump 21, to pass by way of the hose 22 and the hose 22a, into the packer setting water source or channel 28, and down through its channels 28a, 29b and 42 to pass out through a lateral flow passage 70x to bear upwardly against the upper cup base 50 and move this element upwardly to compress the upper pressure packer 17a.

This in turn increases pressure on the lower portion of the sleeve 54 and compresses the uppermost or safeguarding packer 15a. As the pressure exerted upon the upper pressure packer 17a increases, this packer could conceivably give way or become ruptured. In such cases the fluid pressure, which is greater than that for which the pressure packer 17a has been designed, then comes to act upon the uppermost safeguarding packer 15a and sets it as the sleeve 54 is moved upwardly.

In like manner, the lower pressure packer 17b is set by the downward movement of the lower cup 49' as water from the packer setting water port 70y urges downwardly on the base 65. In case the lower pressure packer 17b should give way or rupture, then the fluid pressure will act against the lowermost packer 16a and expand it to set it as a safeguard.

It is pointed out that the expansion of the safeguarding packers 15a, 16a can be controlled by the length of the sleeves 54, 54', respectively, and thus the tolerances between the diameters of tubular devices to be tested, and the outer diameters of this packer, are determining factors.

It is pointed out that the spacer washers 57 may not be necessary in a tool but rather these washers could be component parts of the tool top portion 18 or of the assembly nut 67, respectively, in a tool designed for any given tolerance in testing. However, the employment of these washers in various longitudinal dimensions permits ready variations in longitudinal dimensions of the packers to adapt any one tool to test tubing at various tolerances.

The tool is designed so that no metal parts can readily contact the tubing to be tested, since the assembly nut point is rubber coated while the lower packers are spaced shortly thereabove. Also, the connecting tubular member 44 between the two mandrels may be rubber coated.

The fluid as water, delivered by the pump 21 through the hose 22 to the console 125, is first directed by valve means at the console, not shown in FIG. 1, to pass by way of the hose 22a and the water course 28 in the tool 10 to set the packers 15 and 16, which are located as aforesaid, respectively, above and below the nipples 12 at the top and bottom of a stand of tubing 136 to be tested.

As the packers 15 and 16 are set, the annular space 14 around the tool 10 within the stand 136 is thus isolated, and by shifting valve means at the console, pumped fluid is then passed from the hose 22 by way of the hose 22b and the water course 46 in the tool 10 to pass out through the passage 47c to fill the annular space 14 within the tubing stand 136, and the pump 21 continues to pressurize the space 14 until extremely high pressures, such as 20,000 p.s.i., may be attained as indicated by the high pressure water gauge 24 on the console 125. As the testing pressure acts, there is no action tending to unset the packers should the testping pressure become greater than the packer setting pressure, since the cups 49 and 49' are the elements respectively below and above the pressure packers 17a and 17b, and the space under test and the open ends of the cups are open to the testing fluid.

Obviously, the respective sleeves 54, 54' act as dividers between the respective pressure packers 17a, 17b, and the respective safeguarding packers 15a, 16a, and thus prevent cold flow from the material of one packer to the material of another packer, as would otherwise tend to take place, especially from the pressure packers of softer material to the safeguarding packers of harder material.

As can be appreciated from a consideration of FIG. 1 in connection with FIG. 2A, the tool head 23 is of some substantially larger outer diameter than the outer diameter of the tubing nipple 12 at the top of the tubing string 11, and thus it is of substantially larger outer diameter than the full diameter of the tool top portion 18 therebelow. The tool 10 is thus formed in this dimensional relationship for the obvious reason of providing stock in which an annular groove 74 may be formed whereby the tool head 23 may be fully supported by the nipple 12 at the top of the tubing 11 under test.

Then since the slips 19 shown in FIG. 1 support the weight of the tubing 11 under test, it is not necessary to provide the tool 10 with anchor means, as slip and drag elements to anchor it in the tubing 11. Also, as the tool 10 is thus supported, it requires less development of pressure to set the packers, as an amount of pressure to overcome the weight of the tool does not have to be developed, and all packer setting fluid serves to develop pressure tending to set the packers.

In the modification of packer assembly shown in FIG. 3, a segmented lower packer assembly 75 is provided. Such packer assembly 75 comprises alternate thimble or retainer rings 77 and resilient or flexible seal rings 76 of elliptical or modified elliptical construction with major axis vertical.

The thimble rings 77 each comprise a cylindrical inner part 78 which is slidably installed upon the reduced diameter mandrel or shank section 64a. Outwardly of the cylindrical part 78, and integrally formed therewith, each thimble ring 77 comprises a retainer rim part 79 of modified triangular cross-section extending outwardly from the upper portion of the cylindrical part 78.

An installed each retainer rim part 79 bears downwardly upon the seal ring 76 therebelow and the lower portion of the cylindrical part 78 spaces the seal ring 76 outwardly thereof, the lower outer surface of the retainer ring 77, being of arcuate contour, fits the correspondingly contoured upper inner surface of the seal ring 76.

Thus when packer setting pressure fluid acts through the passage 72a, 70a, in the mandrel portion 63a of the lower mandrel 60a, it urges the piston or plunger 49a downwardly from the shoulder 51a to the lower packer assembly 75. This is accomplished by deforming the seal rings 76 to expand outwardly into contact with the tubing to be tested, such as the tubing stand 136 shown under test in FIG. 1.

The downward urging of the piston 49a thus moves the lower end faces of the retaining rings 77 toward abutment with the respective inner uppermost end faces of the retainer rings 77 adjacently therebelow and consequently deforms the seal rings 76 thereinbetween to urge them outwardly. Thus a construction is provided which tends to exclude foreign matter. And obviously, upon full piston travel and full maximum seal ring compression, with the retainer rings inner parts 78 in complete end to end abutment, this exclustion will be complete.

Of the foreign matter excluded, the mud loss inhibitor material which is often carried in a well bore to inhibit loss of drilling fluid into cavities is one of the materials or elements of foreign matter which may be present, and which, if not excluded, may become lodged between packer elements and mandrel to cause fluid leakage from the tester and also to wear away the seal ring inside of which such material may become lodged.

In the form of the invention shown in FIG. 3, the adjustment nut or sleeve 67b is shown with its internally threaded bore 67a threaded upwardly for its full threaded length on the lower end 53a of the lower mandrel 60a. In this case the base nut, locking nut, or spear point 68a is threaded full up for the depth of the internal threads thereof to lock the adjustment nut 67b into the positions shown, and locking is effected by virtue of the face to face abutment of the respective adjustment nut 67b and spear point 68a. As shown, the relationship of the movement of the retainer rings 77 with relation to the deformable seal rings 76 insures that the retainer rings are in successive abutment when the packer assembly 75 is compressed by the piston 49a.

Should the adjustment nut 67b and spear point 68a be locked at relatively lower position on the mandrel end 53a, the rings 77 will fall short of abutment for the same amount of piston travel as aforesaid, or else a greater piston travel will be required to bring the retainer rings 77 into abutment, thereby permitting a longer time or slower movement in setting the packer.

Obviously, the structures shown in FIG. 3 thus permit the vertical positions of the adjustment nut 67b and of the spear point 68a to be controlled, thereby controlling piston movement before compression of the packer assembly 75 begins; also the degree of radial deformation necessary to set the packer elements 76 can be controlled, and also the total amount of travel of the piston 49a can be controlled.

Figure 4:
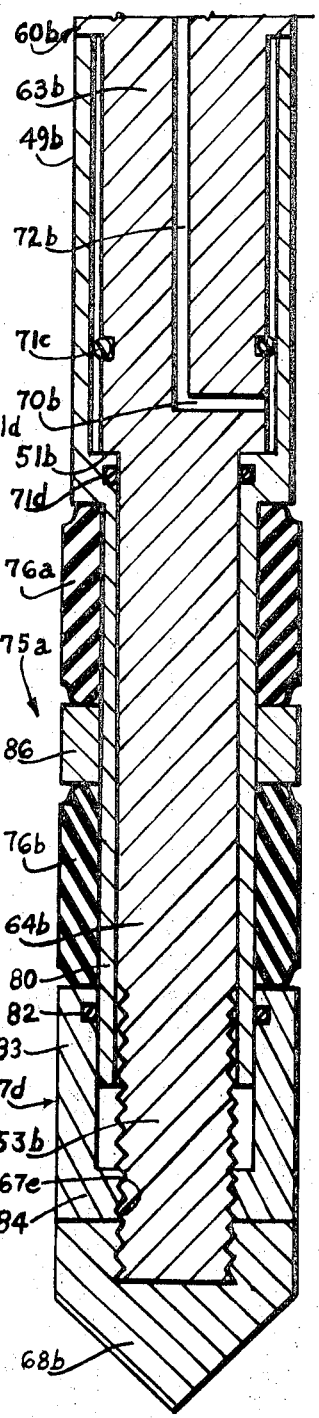
FIG. 4 is a preferred improved embodiment of packer assembly as shown installed on the lower end of the mandrel shown in FIG. 3.

As shown in FIG. 4, a modified piston 49b is provided for setting a testing tool packer, such piston or plunger including a tubular extension or sleeve 80 which extends down around the mandrel section 64b to terminate inside a cup shaped adjustment nut 67d which has an O-ring seal 82 in a groove near the top of its cylindrical wall portion 83, the base 84 of the cup being threaded upon the lower mandrel threaded end 52a. Below the nut 67d a lock nut or internally threaded spear point 68d is provided to be threaded upon the mandrel end 53b to bear upwardly in face to face locking contact against the bottom of the adjustment nut 67d.

A packer assembly 75a which is installed upon the piston sleeve 80, includes an upper packer element 76a with upper end to bear against a lower shoulder on the piston 49b, and also the packer assembly 75a includes a lower packer element 76b with lower end to bear against the upper face of the adjustment nut 67d. A spacer ring 86 is provided respectively between the upper and lower packer element 76a, 76b.

With the form of segmented packer 75a, as employed upon a piston sleeve 80, the mandrel 60b is protected from contact with any foreign matter that otherwise might be forced inside the packer assembly 75a. This protection against foreign matter is reenforced by the provisions of an O-ring 71c in a groove on the mandrel portion 63b and by an O-ring 71d in a groove therebelow in the piston 49b, these O-rings 71c and 71d also preventing leakage of the testing fluid which passes down the test water course passages 72b, 70b.

In the form of the invention shown in FIG. 4, the vertical positions of adjustment nut 67d and spear point 68b can be controlled, thereby controlling initial piston movement before compression of packer assembly 75a begins, or controlling degree of radial deformation necessary to set the packer elements 76a and 76b.

The packer elements 76a, 76b may be of rubber of different hardnesses or durometer readings, whereby cold flow from softer upper element 76a and harder lower element 76b may be minimized.

More important, in this form of the invention, the total amount of piston travel can be adjustably predetermined by setting the distance between the lower end face of the sleeve 80 and the inner surface of the adjustment nut 67d. This permits a definite control of the degree of radial deformation of packer elements.

Figure 5:
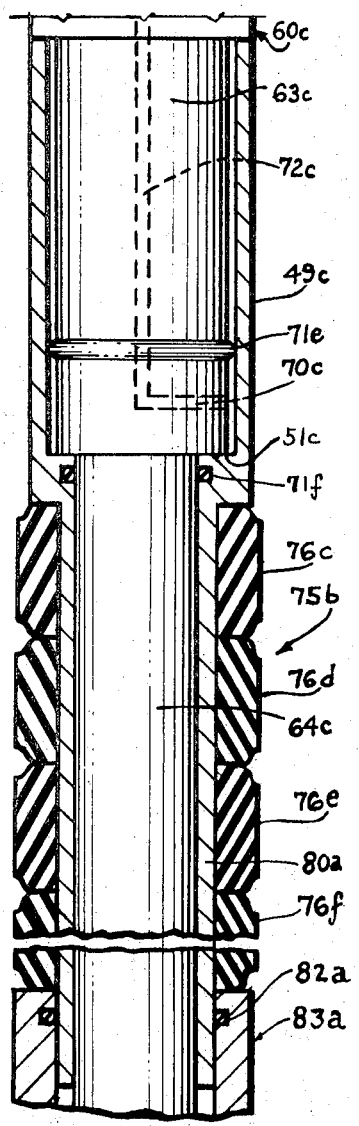
FIG. 5 is still another improved embodiment of packer assembly as shown installed on the lower end of the mandrel shown in FIG. 4.

A variation of packer assembly 75b is shown in FIG. 5, which otherwise has a piston 49c, piston sleeve 80a, adjustment nut 83a, and spear point construction as shown in FIG. 5, which otherwise has a piston 49c, piston sleeve 80a, adjustment nut 83a, and spear point construction as shown in FIG. 4. This assembly comprises packer elements 76c, 76d, 76e and 76f which are preferably of successively increasing hardness of durometer reading from top to bottom to minimize cold flow.

The absence of metallic elements, as spacer rings, between the packer element permits greater radial expansion of the packer assembly 75b, as may be required in conditions where the annulus between testing tool and tubing is comparatively great. Also, this type of packer assembly had best be used in cases where there is a minimum of foreign matter in the fluid in the annulus, which otherwise might become lodged between the plunger sleeve 80a and the packer elements.

The packer assemblies shown in FIGS. 3, 4 and 5 are compressed downwardly to form the lower barrier or confine of the space in which the test fluid is employed. Obviously such packer assemblies may be substituted as well in place of a packer assembly which forms the upper test fluid confining barrier comparable to the packer assemby 15 shown in FIG. 2A. This is accomplished without change in the case of substituting a packer as shown in FIG. 3, but in the case of the packer assemblies shown in FIGS. 4 and 5, the order of installation of packer elements would have to be reserved with softest packer element lowermost and successively harder packer elements upwardly, thereby best to minimize cold flow of the rubber of the packer elements.

In the form of the inventions shown in FIGS. 3 and 5, O-ring seals 71g and 71h and O-ring seals 71e and 71f are provided; respectively, on the mandrel portion 63a and in the piston 49a to seal above and below the testing water lower passages 72a, 70a; and on the mandrel portion 63c of the lower mandrel 60c and in the piston 49c to seal above and below the testing water lower passages 72c, 70c. In FIG. 3, the piston 49a normally shoulders at 51a at the lower end of mandrel portion 63a, and terminates about the upper end of the lower mandrel shank 64a, while in FIG. 5 the piston 49c normally shoulders at 51c at the lower end of the mandrel portion 63c, and in correspondence with the piston construction of FIG. 4, provides a piston sleeve 80a which extends downwardly around the mandrel shank 64c.

As aforesaid, the test fluid and packer setting fluid employed may be a hydraulic fluid or an inert gas, as nitrogen, rather than air, thereby to avoid the danger of explosion which might otherwise arise should it be necessary to compress the air to such great pressure as to overheat it. Also one fluid at one pressure may be employed to set the packets and another fluid at a considerably higher pressure may be employed for testing.

The invention in fact admits of a wide variety of variations in usage as to testing tools. For instance, the packer means shown in FIG. 3 may be employed on sleeve type mandrels as shown in FIGS. 4 and 5. Also one type of packer means may be used as the upper barrier and another type may be used as the lower barrier. Such variations are only exemplary of the many construction combinations which may be employed.

The necessary operating apparatus, including the testing tools as hereinabove described, may all be carried by a single motor vehicle or floated small craft, respectively, and taken to the location of a drilling rig on a land based location, or on an overwater platform.

Figure 6:
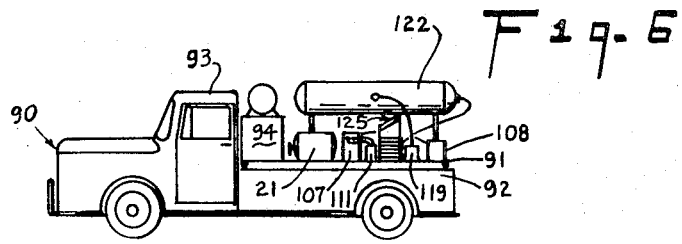
FIG. 6 is a relatively small scale side elevation of a motor vehicle adapted to carry all necessary apparatus to location.
Figure 7:
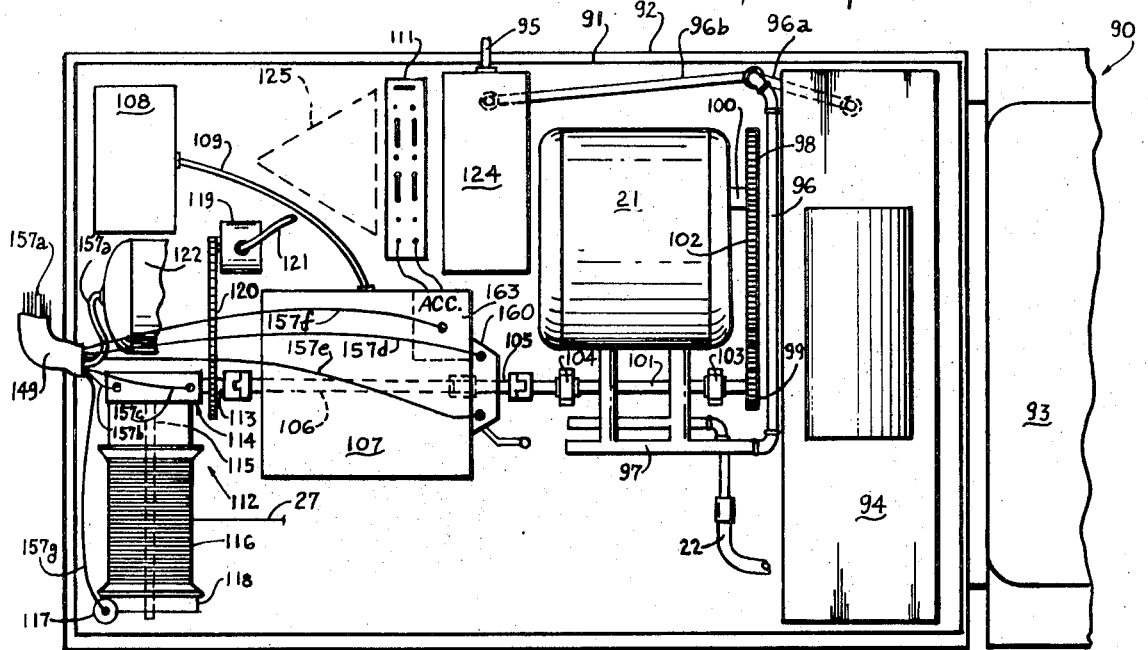
FIG. 7 is an enlarged scale, fragmentary plan view, taken along line 7—7 of FIG. 8, and in which the console is omitted and in which the compressed air reservoir is substantially omitted.
Figure 8:
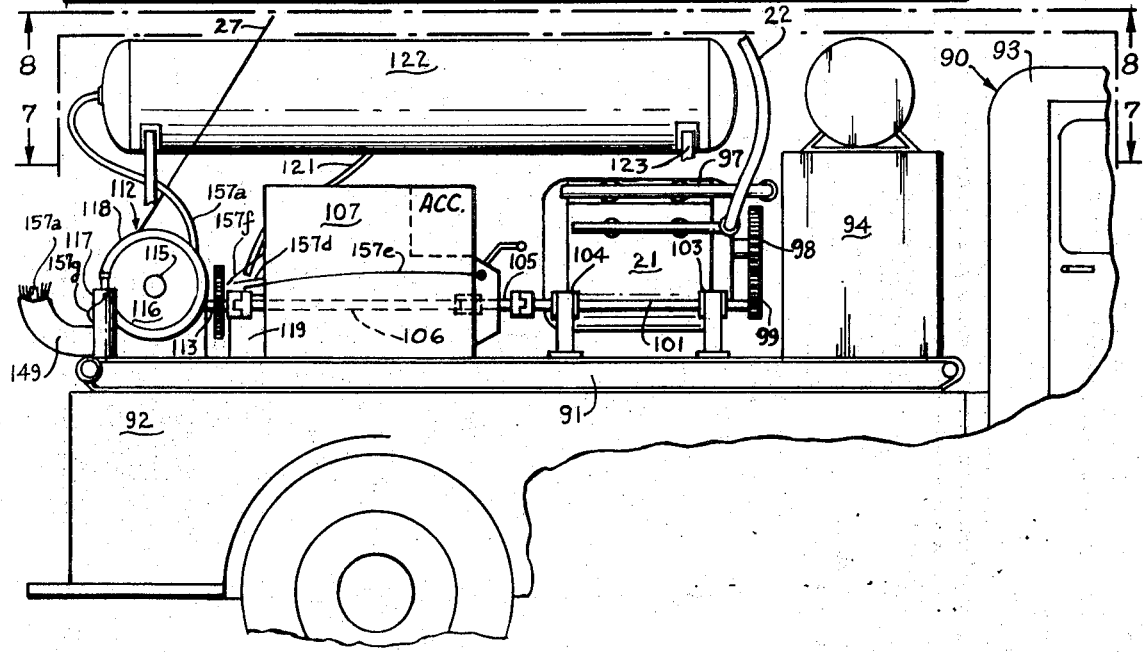
FIG. 8 is a fragmentary side elevation taken along line 8—8 of FIG. 7, showing the opposite side of the truck bed and apparatus thereon from the side shown in FIG. 7.

In FIGS. 6–8, inclusive, the truck 90 shown in FIG. 1, is shown with the necessary apparatus it carries, all in greater detail. Immediately behind the cab 93 of the truck 90, the water tank or reservoir 94 is mounted. Immediately behind the water tank 94, on a skid 91, the remaining apparatus carried by the truck 90 is mounted. This apparatus includes the aforesaid pump 21, centrally forward, and over the right forward corner of the skid 91. The pump 21 takes suction through a conduit 96 connected to an outlet conduit 96a from the water reservoir 94; the conduit 96 being alternatively connectable to an outlet conduit 96b from an auxiliary water reservoir 124 located above the left side of the truck bed 92 to the rear of the pump 21 for use when an offshore drilling operation is served, and having a water line or conduit 95 to the offshore rig, all as will be hereinbelow described.

The suction conduit 96 connects into the pump suction intake 97 and the pump 21 discharges through a discharge outlet or conduit 22 which is extended to the console 125 on the rig floor 20, as aforesaid. The shaft 100 of the pump 21 has a sprocket 98 mounted on its forward, outer end, which is driven by a sprocket chain belt 102 from a pinion sprocket 99 on a line shaft 101. The line shaft 101 extends longitudinally above the truck bed 92, substantially centrally thereof, and is supported for rotation by forward and rear pillow blocks 103, 104. The rear end of the line shaft 101 is clutch-connected by an engine clutch 105 to the Diesel engine drive shaft 106 which is aligned in rearward co-extension of the line shaft 101, and thus, the Diesel engine 107 is disposed substantially centrally upon the skid 91, to the rear of the pump 21.

The Diesel engine 107 is supplied fuel from a fuel tank 108 on the left rear corner of the truck bed, which delivers fuel through a fuel line 109 to the conventional Diesel engine fuel feed pump, not shown. Also, an electric storage battery 111 is mounted on the left side of the truck bed 92, and to the left of the forward end of the Diesel engine 107, to supply starting current to a starting motor which rotates the Diesel engine flywheel to start it, both motor and flywheel being conventional and not indicated separately from the Diesel engine 107.

A winch 112, on the right rear corner of the truck bed, is driven by a shaft 113 which is connected to be driven by the Diesel engine shaft 106 in forward alignment therewith. The shaft 113 transmits drive through a gear box and clutch assembly 114 to a winch drum shaft 115 at right angles thereto, and on which is mounted a winch drum 116. A compressed air cylinder 117 at the right rear corner of the winch drum 116 is actuated, as will be hereinbelow described, to operate a brake band 118 at the outer end of the winch drum 116.

The air compressor 119 to the left and rear of the Diesel engine 107, has a pulley on its shaft which is driven by a V-belt 120 from a pulley mounted on the shaft 113. The compressor 119 discharges compressed air, through a discharge conduit 121 to an aforesaid compressed air reservoir or chamber 122. The chamber of reservoir 122 is best shown in FIGS. 6 and 8 as mounted on the truck 90 above the Diesel engine 107, and supported by a conventional stanchion and beam structure 123 on the longitudinal center line above the truck bed 92.

The aforesaid console 125, when in transit, occupies the position shown in FIGS. 6 and 7, on the left side of the truck bed, between the battery 111 and the compressor 119.

As best shown in FIGS. 9 and 10, the console 125 comprises a support or stand 127 having a triangularly shaped, tilted table top 128 mounted on top thereof, with apex and uppermost and supported by an upright 129, and with base and lowermost, and supported by the uprights 130a, 130b.

The high capacity water gauge 24 which measures water pressures in excess of 20,000 p.s.i. is mounted centrally of the table top 128 above the apex end of the base. Also, centrally, and immediately below the high pressure gauge 24, a compressed air gauge 132 of capacity to measure pneumatic pressures up to 115 p.s.i. mounted on the table top 128.

The liquid, as water, which is delivered by the pump 21 to operate the testing tool 10, is supplied through the discharge conduit or hose 22, which is extended from the truck 90 to the console 125 on the drilling rig platform 20; where the free end of such conduit 22 is connected to the lower end of rigid piping 151 on the console 125.

The piping 151 includes, successively, from lowermost to uppermost, a teel 151a to which a recorder, not shown, may be connected to continuously record pressures, when such a record may be desired. Above the tee 151a a check valve 152 is provided to protect against back pressures. Above the check valve 152 a tee 151b is provided from which a flexible conduit 153 extends to the high pressure capacity water pressure gauge 24 which stands up above the apex end of the triangularly shaped table top 128. Above the tee 151b the piping 151 makes a right angle turn, by means of an elbow 154, and extends horizontally to the right along the front of the console top 128, and includes, from left to right: first, a tee 154a into the lower leg of which a needle valve 155a is installed to the lower end of which is connected the aforesaid flexible conduit or hose 22a; second, a tee 154b into the lower leg of which a needle valve 155b is connected, with the lower end of the needle valve 155 b having connected thereto the hereinabove described flexible hose or conduit 22b; and third, an elbow 156 frm the lower leg of which the piping 151 turns downwardly and provides a needle valve 155c through which the water which sets the packers may be released or bled off in order to deflate the packers 15 and 16, as will be hereinbelow described.

As aforesaid, the compressor 119 discharges through the conduit 121, and keeps the compressed air reservoir 122 full of air compressed to a pressure of approximately 115 p.s.i. The aforesaid delivery conduit 157*a* from the compressed air reservoir 122 extends through the sheath 149 to the compressed air manifold 150 which is taken with the console 125 to the drilling rig floor or platform 20. From the manifold 150 four delivery conduits 26*a*, 26*b*, 26*c* and 26*d* pass therefrom, respectively: 26*a* into an inlet into a three-way valve 158 which controls the direction in which the winch drum 116 is rotated either to pick up or to pay out the wire line or cable 27; 26*b* into an inlet into a three-way valve 159 which actuates a compressed air cylinder 160 to connect or disconnect the clutch 105 of the engine shaft 107 to the line shaft 101 which drives the pump 21; 26*c* into an inlet into a two-way valve 161 which controls the amount of compressed air admitted to the engine accelerator 163 to control the speed at which the engine 107 drives the pump 21; and 26*d* into an inlet into a two-way valve 162 which admits compressed air to the compressed air cylinder 117 to control the degree of application of the brake band 118 which regulates the rate at which cable 27 is paid out or is taken up.

The other two connections into the three-way valve 158 have the flexible lines 157*b* and 157*c* connected thereinto, and these lines pass from the console 125 through the sheath 149 and pass out of the sheath at its truck bed end and connect to opposite sides of the winch clutch and gear box assembly 114 and connect drive means therein to drive the shaft 115, on which the winch drum 116 is mounted, in direction to rotate the winch drum, respectively, to pay out or take up, the wire line or winch cable 27.

The other two connections into the three-way valve 159 have the flexible lines 157*d* and 157*e* connected thereinto, and these lines pass from the console 125 through the sheath 149 and pass out of the sheath at its truck bed and connect to opposite sides of the Diesel engine compressed air cylinder 160 which actuates the clutch 105, to connect the engine drive shaft 106 to drive, or to disconnect the engine shaft 106 from driving, the line shaft 101 which drives the pump 21.

The compressed air conduit or line 157*f*, which extends from the connection to the two-way valve 161, opposite the connection of the conduit 26*c* thereto, extends from the console 125 through the sheath 149 to the accelerator 163 of the engine 107, and, as controlled by the valve 161, admits compressed air to the accelerator 163 in amount to control the rate at which the engine shaft 106 is revolved.

The compressed air conduit or line 157*g*, which extends from the connection to the two-way valve 16*a*, opposite the connection of the conduit 26*d* thereto, extends from the console 125, through the sheath 149 to the compressed air cylinder 117, and as controlled by the valve 162, admits compressed air to the cylinder 117 in amount to control the pressure with which the brake band 118 brakes the rotation of the winch drum 116, and thereby controls the speed with which the wire line cable 27 is paid out or taken up.

Levers 164*a* and 164*b* on the respective three-way valves 158 and 159, include respective cowls 171*a*, 171*b*, which, as best seen in FIG. 1, may be rotated counter-clockwise to UP positions as the respective stop lugs 166*a* and 166*b* on the valve housings are contacted, thus establishing compressed air communication between conduits 26*a* and 157*b*, and between conduits 26*b* and 157*d*. Conversely, the levers 164a and 164b may be rotated clockwise to DOWN positions, as the respective stop lugs on the valve housing are contacted on the opposite sides thereof, thus establishing compressed air communication between conduits 26*a* and 157*c*, and between conduits 26*b* and 157*e*. A piston, not shown, in the engine clutch cylinder housing 160, is of the type which will mechanically latch in that position to which shifted by the force of the compressed air admitted thereagainst from the conduit 157*d* or from the conduit 157*e*. Then, as the lever 164*b* may be released, spring means, not shown will automatically return it to NEUTRAL position.

When the lever 164*b* is returned by the spring means, not shown, to NEUTRAL position, the respective conduits 157*d* and 157*e* are placed in commumication with bleed passage means, not shown, in the valve 159, whereby the compressed air which has moved the aforesaid piston to temporarily latched position, may be "bled off" to the atmosphere.

The lever 164*a* which operates the valve 158, is also of the type which is automatically spring returned to NEUTRAL position when released. In this case the compressed air which has passed through a respective conduit 157*b* or 157*c* to actuate the engagement of the shaft 113 to be driven by the engine shaft 106, is placed in communication with a bleed passage, and the bleeding off of this air from either conduit 157*b* or 157*c* relieves the pressure which keeps the shaft 113 in drive engagement, whereby the winch 112 is stopped. Thus the operator must keep his hand on the lever 168*a* as long as the winch 112 is running, whether in direction to take up or to pay out cable.

The compressed air from the aforesaid compressed air reservoir 122 passes through the core conduit 157*a* to the manifold 150. A tee 165 is installed in this core conduit 157*a* adjacent the manifold 150 and a conduit 169 from this tee 165 leads to the compressed air gauge 132 having its face readable above the op of the console table 128.

Since a relatively slight compressed air pressure is necessary to apply the brake band 118 to the winch drum 116 to control, by braking, the paying out and taking up of the wire line cable 27, a needle valve 167 may be installed in the compressed air supply conduit 26*d* to the two-way valve 162, and this needle valve 167 may be set to reduce the compressed air pressure delivered through the conduit 157*g* to say 10–12 p.s.i.

Thus, when the winch 112 is either paying out or taking up cable 127, it is only necessary for the operator to turn the lever 168*b* of the valve 162 upwardly to full braking position and then release such lever, and ample compressed air pressure will be continuously supplied to the compressed air cylinder 117, and the brake band 118 thereby continuously applied whenever the tool 10 is being raised or lowered.

Obviously, it is not feasible to stabilize or set the Diesel engine accelerator 163 at any set speed for the Diesel engine 107, and thus, the compressed air supply line 26*c* does not have a needle valve therein to function correspondingly as the needle valve 167 in the supply line 26*d*.

The operation of testing tubing can be carried out by a single truck over a long period of time as when tubing is tested in the process of making up tubing strings as suspended stand by stand into deep wells. While actual testing proceeds only a single operator is necessary and the other operator may be otherwise disposed to await his shift at testing. The engine 107 on the truck bed 102 having been started in conventional manner and with the tool 10 in testing position, as supported on the uppermost nipple 12 of the uppermost stand or tubing 136 as indicated in FIG. 2A, the lever 164b is moved to up position to start the pump and the operator holds the acceleration lever 168a under control and opens the packer setting valve 155a as the testing valve 155b and bleed valve 155c are kept closed. The pump then draws water from the tank 94 and delivers it by way of the flexible conduits 22 and 22a to the packer setting channel 28 in the testing tool 10 to set the packers which isolate the test space 14 as shown in FIG. 1.

When the pressure indicated by the pressure gauge 24 informs the operator the upper and lower tool packers are firmly set, he closes the valve 155a to lock the packers in set position and opens the valve 155b so that the pump delivers the hydraulic fluid as water through the hose 22b to the testing fluid course 46 in the tool to pass out into the annular space 14, thus to place the uppermost stand of tubing 136, including its nipple joints 12, under testing pressure.

While the pump operates, the operator holds the lever 168a under control and thus senses the rate at which the pump 21 is pumping. As the fluid is delivered through the test channel 46, a higher pressure can be developed for testing than is necessary for setting the packers, and this pressure is reflected by the gauge 24, the fluid delivered by the hose 22 passing by way of the conduit 153 to act against the gauge 24. If the operator observes no falling off of the gauge 24 he knows that there is no leakage in the stand length of tubing tested, and testing may proveed, and as a gauge reading stands steady the valve 155b may be closed.

Whether the gauge 24 indicates leakage by a falling off in its reading, or whether no leakage is indicated by the high reading holding constant, the operator gives the appropriate signal, pulls the lever 164b to DOWN position to de-clutch the pump drive, and then releases such lever 164b to be spring returned to NEUTRAL position.

He then opens the bleed-off valve 155c and the packer setting valve 155a and the packers contract, as their rubbers tend to return to their normal position, and this forces out or bleeds off that amount of fluid that has gone to expand the packers, after which bleed-off valve 155c may be closed. As the packers retract the water that has been used for testing falls down into the well bore and is thus expended as an operating fluid.

The operator now moves the lever 164a to UP position to actuate the gear box and clutch assembly to en-clutch the winch 112 to be driven by the engine 107 and in direction to take up cable 27, whereby the cable 27 lifts the tool 10 out of the stand of pipe 136 tested, and clear of the operation of the travelling block 135 and the elevators 170 suspended therefrom, which normally engage as a safeguard right under the uppermost nipple 12, as for instance, to take up the support of the tubing string 11, in case of failure of the slips 19 to hold the tubing string.

The drilling rig crew now takes over operation, and if leakage has been indicated, the rig apparatus is used to remove the stand indicating leakage, and it is replaced by a new stand to be tested. Otherwise, when no leakage is indicated, the crew retracts the slips 19, while the elevators 170 below the travelling block 135 grasp the top of the tubing and the derrick thus supports the tubing string 11 from the crown block 133. Then the crew lowers the stand just tested and resets the slips 19 to support such stand with the top thereof slightly above the slips 19. Then the crew, using the travelling block 135 and elevators 170, adds a new stand of tubing to take position as an uppermost stand 136 awaiting test.

The operator now graps the lever 166a, (which has been spring returned to neutral position upon release to de-clutch the winch 112 from engine drive), and upon the lever being pulled down and held in DOWN position, the winch 112 is driven in opposite direction to pay out cable 27 to lower the tool 10 into the next stand of tubing to be tested.

When the drum 112 is being driven in either direction, the operator has turned the lever 168b to UP position, so that the fractional compressed air pressure required to apply the brake band 118, as reduced by the reducer 167, acts continuously to brake the winch drum rotation. As aforesaid, as the engine runs, the operator controls the accelerator lever 168a, while the hoist 112 is operating, as well as when the pump 21 is pumping fluid.

It may not be desirable to use a testing fluid which, when it is released, falls by gravity down into the well bore, where it may cause contamination. For instance, in many cases, it is not desirable to dilute or in any manner alter the constituency of a drilling mud or fluid used in drilling the well. Thus an inert gas, as nitrogen, may be used, thereby to obviate any contamination of the drilling fluids. In this case bottles or vessels 171 of nitrogen have been brought to the field on the service truck 90, as shown in FIG. 11, the truck 90 being otherwise laden with the apparatus hereinabove described.

The nitrogen bottles 171 are manifolded or series connected as indicated by the piping 172 and from this manifold a conduit 173, having two successively downwardly seating check valves 174a, 174b, has its upper end connected into the top of a pressure vessel or cylinder 175. The cylinder 175 has respective upper and lower hemispherical ends 175a and 175b to close the pressure vessel, and these ends carry respective handles 176a, 176b by which the pressure vessel 175 may be manipulated and mounted.

As shown in FIG. 11, this pressure vessel or cylinder 175 has been lifted from the truck 90 and taken up on the rig floor 20 and positioned on the derrick 131, as indicated. From the lower end of the lower closure 175b there extends a valve 177 which is connected by a flexible conduit 22c to the lower end of the valve 155a, (to which the hose 22a has been formerly connected). From the upper end of the cylinder 175 there extends a valve 178 which is connected by means of a conduit 182 to a tee 179 at one end of piping 180, this piping 180 having been mounted on the side of the console 125, as shown in FIG. 11, to support the use of gas, as nitrogen, in testing. A gauge 181 is connected into the central leg of the tee 179 to indicate the pressure of the nitrogen discharged from the cylinder 175 into the line 182.

Along the side of the console 125, forwardly of the tee 179, the piping 180 includes a valve 183 therein and farther forwardly it includes a tee 184, and into the central leg of this tee 184 a nitrogen bleed-off valve 185 is connected. Then at the forward end of the piping 180 a valve 186 is provided into the forward end of which the flexible conduit or hose 22b is connected. As the console 125 has been set up on the derrick floor 20, the conduit or hose 22b, along with the hose or conduit 22a, (now extending from the needle valve 155b), have been taken up into the derrick 131 to be suspended over, and taped to an upper derrick member 143a, corresponding in functions with the aforesaid horizontally extending derrick member 143. Also, as shown in FIG. 11, the free ends of the respective hose 22a and 22b have been brought back down and extended through the guide sleeve 147 and connected to carry fluid to the respective packer setting and testing fluid courses or channels within the tool 10. Then the wire line or cable 27 has been connected into the swivel 139 at the top of the tool, and tool 10 has been raised above the top of the tubing string 11, as supported by the slips 19 and with the elevators 170 engaged near the top as a safeguard, and then the tool 10 has been lowered down into the top of the tubing string 11 until the tool head 23 rests upon top of the nipple 12 the uppermost stand of tubing 136.

In the meantime the cylinder, pressure vessel, or nitrogen reservoir 175 has been filled with nitrogen by opening banks of nitrogen bottles on the truck 90 to pass nitrogen into the manifold 172, and thence through the valve 189 and by way of the conduit 173, and through the check valves 174b, 174a into the reservoir 175, and with the valve 178 open, up to the gauge 181 in the auxiliary console piping 180, the valve 183 in the piping 181 and also the nitrogen bleed-off valve 185 and the nitrogen delivery valve 186 being closed. Also the needle valves 155a, 155b and 155c in the main console water piping 151 are closed at this point.

The operator now opens the needle valve 155b as the engine 107 is started, and operates the lever 164b to place the pump 21 in drive to pump water to pass through the hose 22a to set the tool packers. Then he closes the valve 155b as he opens the valve 186 to let the nitrogen pass on into the testing annulus 14 about the tool 10, and at the same time opens the valve 155a so that the pump 21 now pumps water, by way of the hose 22c, into the lower end of the nitrogen reservoir 175 to pressurize the nitrogen 187 as water 188 rises in the reservoir to reduce the nitrogen space, as indicated in the cutaway section of the reservoir in FIG. 11. As this takes place the nitrogen gauge 181 reflects the nitrogen pressure that is being developed and when the pressure attains the requisite figure to indicate that the stand of tubing 136 under test does not leak, or when the reflection of the gauge 181 falls off, to indicate leakage, as the case may be, in any event, the signal is given preceding the removal of the tool 10 from the tubing string 11 until a next stand may be added thereto.

In this case the operator moves the lever 164b to DOWN position to de-clutch pump drive, and opens the water bleed-off valve 155c so that the water that has pressurized the nitrogen in the reservoir 175 may be released, and the sound of the beginning of nitrogen passage into the valve 177 indicates that this valve should be closed. By draining off the pressurizing water in this manner the nitrogen expands to fill the space evacuated by the water, and this reduces the amount of nitrogen in the test annulus 14 and in the hose 22b leading up to the valve 183 which may now be closed. It should also be noted that the nitrogen pressurizing water is recoverable since a flexible conduit 95, shown in dotted lines in FIG. 11, can be installed to convey this fluid, by gravity, back to the water tank 94, or back to the auxiliary water tank 124 in case an offshore rig is being served from a motor vessel which carries the skid mounted apparatus thereon.

Then, with the valve 183 closed, and the valves 186 and 185 open, the test nitrogen remaining downstream of the valve 183 may be drained, at least in part, to the atmosphere. Then, with the valve 155a closed and the valve 155c open, the valve 155b may be opened to bleed off the water which has set the packers so that the tool may be removed, and the next stand 136 installed in the same manner as aforesaid.

The invention comprises essentially apparatus and method of testing tubing which permits all necessary apparatus to be carried on a single vehicle to a testing location. Also, the apparatus, which is skid mounted, can be transferred in whole to a small vessel and taken out to the location of an offshore drilling rig. In addition to the advantages of providing a compact portable assembly of equipment, the apparatus is designed for speed and operation as all of the levers and valve handles essential to carrying out testing are located on a console while the only two connecting elements which extend between the assembly of operating apparatus and the console comprise the water supply hose or flexible conduit and the sheath which has the compressed air connections therein which actuate the various apparatus, and which also has therein the flexible conduit core or compressed air supply line.

The invention also includes means and method for testing with an inert gas, as nitrogen, rather than water, where it may not be desirable to expend test water into the well bore, to contaminate or to change the constituency of products down in the well, such as the drilling mud.

Also, the invention permits the use of an inert gas in testing, and additionally permits the recovery of some goodly part of the testing gas, also the water employed to pressurize the gas is returnable to the water tank.

The invention has further flexibility in that the tool which carries out the test is ingeniously constructed so that the packers which isolate the test space may be set through one channel or fluid course, while the testing fluid may be supplied through another fluid course or channel, thus permitting the use of different fluids, as a gas, a liquid, or a gas and a liquid, for testing and/or packer setting.

Also particularly, the packers themselves are constructed uniquely in that they insure against any metal contact with the inner surface of the tubing that is tested, so that only the packer rubber or relatively softer flexible material of the packer contacts the tubing. This is of special importance when the inner surface of the tubing may have been protectively coated, as, for instance, with epoxy resin, which could be abraded or scratched through by metal contact.

An improvement in console arrangement, and in use of associated apparatus, is shown in FIG. 12, in which a winch 112a is shown with shaft 166 supported by support means 201 mounted on a common skid 202, as indicated in dotted lines. Also, a hydraulic motor 153 is mounted on the skid 202 in position for connection to drive the drum of the winch 112a. Hydraulic fluid conduits 169a and 169b are shown extending from the hydraulic motor 169 to the truck unit or vehicle 26a, and into a hydraulic pump 203 disposed on the skid mount 92 in the relative position of the hoist 112 shown in FIGS. 1, 7 and 8. The gear box and clutch assembly 114, hereinabove described as to location, construction and function, is connected to drive the hydraulic pump shaft 115a, as clutch connected in turn for drive by the Diesel engine drive shaft 106, as best indicated in FIGS. 7 and 8. Clutch connection and direction of drive are effected by admitting compressed air through the respective conduits 157b, 157c into the gear box and clutch assembly 114, correspondingly as in the case of selectively connecting the winch 112 be driven by the Diesel engine drive shaft 106, also as hereinabove described.

Thus, the console 125a, as shown revised in FIG. 12, retains the hereinabove described three-way valve 158, with conduits 157b, 157c extending from the gear box and clutch assembly 114, through the sheath 149, to the valve 158, as aforesaid. However, with the hydraulic motor 159 on the rig floor, it is possible and convenient manually to brake the hoisting operation of the testing tool 10. The structure for accomplishing this is shown in FIG. 12 as comprising a bellcrank lever 163 with the upper arm 204 extending upwardly through a slot 205 in the top of the console 125a, thus to provide a handle 206 by which an operator may apply a braking force. This is accomplished by pushing the handle 206 away from the operator. As the bellcrank lever is pivoted on a pin 207, extending from the frame of the console 125a, the lower arm 208 is thus pivoted downwardly, so that the arcuate bearing surface 165 on the outer end of the lower arm 208 bears upon the winch drum shaft 166 to retard its rotation. Thus, the intimate and immediate control of the braking of the hoist speed permits a much finer and more quickly applied control of the lowering and raising of the testing tool 10 than can ever be obtained by braking the hoist (when on the vehicle) by applying an air brake 117, as shown in FIGS. 7, 8 and 11. It follows that with this form of braking hoist movement the two-way valve 162 (shown in FIGS. 9–11), and connections and accessories thereto, may be eliminated from the console.

Also, the two-way valve 161, shown on the console 125 in FIGS. 1, 9 and 11, is moved beneath the console 125a and into a position to be operated by a foot treadle 161a, shown in FIG. 12, the reference numeral 161a in this view also indicating the valve which the foot treadle operates. The valve 161a, including its foot treadle replacing the handle 168a shown in FIG. 9, is otherwise constructed identically with the two-way valve 161 on the right side of the console 125 in FIG. 9. Correspondingly, the conduit 26d is shown in FIG. 12 as extending from the compressed air manifold 150 under the console 125a to the valve 161a, as graphically identified by its foot treadle 161a.

An improvement is disclosed in FIG. 13 which permits pre-adjustment of stroke of the type of pistons 49b, 49c shown in FIGS. 4 and 5, respectively. In such view the tool lower mandrel 60d is constructed in correspondence with the respective mandrels 60a, 60b, 60c shown in FIGS. 3, 4 and 5. The mandrel 60d thus having a reduced diameter, lower section 64d to provide a shoulder 51f, with the lower portion 53c of the mandrel lower diameter section 64d being externally threaded. The piston 49d, which is slidable upon the mandrel section 64d has an O-ring containing groove 71h therein to seal between mandrel and piston, the piston 49d having a sleeve 80b as the lower part thereof, and onto which a packer assembly 75c is installed.

Such packer assembly 75c is shown in FIG. 13 as comprising upwardly a metallic wear and spacer ring 86a, a packer 76d, as of hard rubber, a central or smaller division spacer or metallic ring 86b, a second packer 76d, and a second or lower ring 86b. A cup or "pot" member, open upwardly, is installed on the threaded mandrel portion 53c, and therebelow a lock washer 86b is threaded upon the aforesaid threaded mandrel portion to lock the assembly in a predetermined initial position. Also a bull plug 68c is threaded upon the terminal part of the portion 53c, thus to protect the threads and to further lock the tool together in assembly.

The cup or pot 67f has a plurality of annular, metallic shims 84b therein, to receive the mandrel section 64d therethrough, as the shims are supported upon the cup or pot 67f. If the packer assembly 75c is to be expanded against a tubing size of largest inner diameter, all of the shims 84b are left in place. However, if not such great expansion of the packers will be required, as where the inner diameter of the tubing to be tested may be smaller, a shim or shims 84b may be added prior to use of the tool. This insures that the packer rubber expansion is greatest where the distance from the tool to the well tubing is greatest. By this pre-adjustment the degree of packer expansion can be pre-determined, as required.

An O-ring containing groove 71g within the mandrel 60d above the shoulder 51f is provided, thus to seal between the mandrel 60d and piston 49d. The packer setting fluid thus passes down the bore 72d, through the radially extending passage 70d, and down a peripheral slot 70c in the mandrel, to urge downwardly on the base of the piston 49d to set the packer assembly 75c (packers 76d) against the tubing to be tested. The further the travel of the sleeve 80b, the greater the expansion of the packers 76d. When the lower end of the sleeve 80b strikes the uppermost shim 84b, limit is placed on expansion. Correspondingly, a piston that moves upwardly can have its sleeve upper end strike corresponding travel limiting structure.

It should be understood that the invention is not limited to the exact structures and method steps hereinabove described and disclosed in the drawings but other structures and methods may also be employed. For instance, the compressed air system could be replaced at least in part, by hydraulic fluid control to control operation of mechanism and methods of testing. In effect, the invention has limitations only as those imposed thereon by the broad concept of a tool which sets and tests the packers through two different channels; and without metal contact with the inner surface of the tubing; which has a minimum (only two) of tubular elements between the means transporting and mounting essential apparatus and the console on the drilling rig floor; and which also locates the console or control with respect to equipment in manner that the whole operation of testing can be conducted by a single operator in a selective position of observation on the drilling rig floor. Also pre-adjustment can be made for packers to fit firmly in various tubing inner diameters. Consequently, the invention is only limited by the broad spirit thereof, and by the broad scope of interpretation claimed for, and merited by, the appended claims.

The invention having been described, what is claimed is:

1. In a method of testing successive lengths of tubing in a tubing string, the steps of releasing a pressurized inert gas to pass into a reservoir, admitting a pressurized, non-compressible liquid, into the reservoir to further pressurize the gas, inserting a tester into predetermined position in the uppermost stand of a tubing string disposed within a well bore, applying pressurized fluid at a first pressure through a first fluid course in the tester to deform seal means on the tester into sealing engagement with the well bore so as to isolate an annular space between the tester and bore, applying the further pressurized gas at a second and higher pressure through a separate second fluid course in the tester into the annular space, observing the pressure of the gas, whereby, a falling off of the pressure indicates leakage, and whereby the pressure holding constant indicates that the stand does not leak, relieving the pressurizing liquid from the reservoir to permit the testing gas to expand, closing the second fluid course between the annular space and the reservoir, and releasing the fluid from the seal means to permit it to contract, whereby the testing gas outward of the closure is released.

2. In a method of the character defined in claim 1, the further step of bleeding off a portion of the expanded gas before releasing the fluid from the seal means.

3. In a method of the character defined in claim 1, the further step of recovering liquid for reuse as it is relieved from the reservoir.

* * * * *